(12) United States Patent
Barquist et al.

(10) Patent No.: US 7,341,164 B2
(45) Date of Patent: Mar. 11, 2008

(54) ICE CHEST AND COOLER HAVING RETRACTABLE LEGS

(76) Inventors: Aaron W. Barquist, 8950 Forked Creek Way, Elk Grove, CA (US) 95758; Shannon Hanson, 7641 Pheasant Down Way, Sacramento, CA (US) 95828

( * ) Notice: Subject to any disclaimer, the term of this patent is extended or adjusted under 35 U.S.C. 154(b) by 848 days.

(21) Appl. No.: 10/872,517

(22) Filed: Jun. 22, 2004

(65) Prior Publication Data

US 2005/0279750 A1 Dec. 22, 2005

(51) Int. Cl.
*B65D 25/14* (2006.01)
(52) U.S. Cl. .................... 220/629; 220/592.03
(58) Field of Classification Search ............. None
See application file for complete search history.

(56) References Cited

U.S. PATENT DOCUMENTS

| | | |
|---|---|---|
| 4,392,662 A | 7/1983 | Hoglinger |
| 5,056,878 A | 10/1991 | Givens |
| 5,249,438 A | 10/1993 | Rhaney et al. |
| 5,295,365 A | 3/1994 | Redford |
| 5,480,170 A | 1/1996 | Kaiser, II |
| 5,551,558 A | 9/1996 | Bureau |
| 5,588,377 A * | 12/1996 | Fahmian ................. 108/145 |
| 5,632,209 A * | 5/1997 | Sakakibara ............. 108/145 |
| 6,421,853 B1 * | 7/2002 | Pecorelli et al. ............ 5/606 |
| 6,739,150 B2 * | 5/2004 | Mompo Garcia ........ 62/457.7 |
| 7,249,771 B1 * | 7/2007 | Brennan et al. ............. 280/35 |

* cited by examiner

*Primary Examiner*—Stephen J. Castellano
(74) *Attorney, Agent, or Firm*—Richard C. Litman

(57) ABSTRACT

An ice chest has retractable, telescoping legs extending at respective forward and rearward angles from each respective endwall of the ice chest. The ice chest has handles at the upper central portion of the ice chest endwall having push buttons therein which release the telescoping legs from a locked position and which fall to the open position under their own weight and lock in a secure position. The push buttons actuate the locks by a linkage system. The front legs have pads at their lower ends, protecting the ends of the legs, and providing weight to pull the legs into the open, locked position. The rear legs have wheels which also providing weight to pull the legs into the open, locked position. A similar water cooler has retractable legs which have pads on their lower ends pulling the legs downward upon pushing buttons on handles on the sidewalls.

20 Claims, 15 Drawing Sheets

ICE CHEST AND COOLER HAVING RETRACTABLE LEGS

BACKGROUND OF THE INVENTION

1. Field of the Invention

The present invention relates to portable ice chests and coolers. More particularly, the present invention relates to ice chests and coolers having supporting legs.

2. Description of the Related Art

Portable ice chests are a commonly used item, particularly for picnics, camping, or for temporary storage of food items. They are typically rectangular box-like containers made from inner and outer metal or plastic walls, having handles at each end and a lid, which is openable, pivoting on hinges along the upper lip of the container along one side. It is necessary to put the chest on a table or the like to avoid stooping over to remove an item from the chest. Coolers for holding cold beverages are similarly constructed, being round or rectangular containers having a removable top for introducing ice and beverage or water. A spigot may be provided near the base of the cooler for pouring liquid into a cup or glass. Convenient use of such a cooler requires a table or support. It would be desirable to provide retractable legs to support the ice chest or cooler which may be easily released by pressing a button on each of the handles, thus supporting the chest or cooler without the necessity to bend over to set the chest or cooler down. The legs may have a telescoping structure to allow the ice chest to be supported at a height substantially greater than the height of the ice chest wall. It would also be desirable that the legs be automatically locked in place upon the downward deployment of the legs and that the legs angle outward to provide a more stable footprint to avoid tipping. This is desirable since the filled weight of the chest or cooler is substantial. It would also be desirable that the height of the legs be-adjustable. Other desirable features would include wheels on the front or rear legs and pads on the other legs to avoid sinking into soft ground and protecting the lower ends of the legs.

U.S. Pat. No. 4,392,662, issued Jul. 12, 1983, to Hoglinger, describes a container structure having retractable legs with bottom casters.

U.S. Pat. No. 5,295,365, issued Mar. 22, 1994, to Redford, describes an invertible cooler having telescoping legs as end supports (see FIG. 6).

U.S. Pat. No. 5,480,170, issued Jan. 2, 1996, to Kaiser, II, describes a wheeled cooler caddy having vertical retractable legs. The height of the legs is determined by placing pins within one of a series of spaced pin receivers.

U.S. Pat. No. 5,551,558, issued Sep. 3, 1996, to Bureau, describes a cooler having folding legs.

U.S. Pat. No. 6,409,186 B2, issued Jun. 25, 2002, to Bennington, describes a mobile cart for hot or cold items having retractable legs to vary height.

None of the above inventions and patents, taken either singly or in combination, is seen to describe the instant invention as claimed. Thus an ice chest or cooler with retractable legs solving the aforementioned problems is desired.

SUMMARY OF THE INVENTION

The ice chest of the present invention has retractable, telescoping legs extending at respective forward and rearward angles from each respective endwall of the ice chest. The ice chest has handles at the upper central portion of the ice chest sidewalls having push buttons therein which release the telescoping legs from a locked position and which fall to the open position under their own weight and lock in a secure position. The push buttons actuate release of the locks through a linkage system. The front legs have pads at their lower ends to avoid sinking into soft ground, protecting the ends of the legs, and providing weight to pull the legs into the open, locked position. The rear legs have wheels attached at their lower ends to allow mobility of the ice chest and also provide weight to pull the legs into the open, locked position. The legs may be easily returned to their stored position by pressing the buttons on the handles, thus releasing the locks, and then pushing downward on the handles until the lower ends of the telescoping legs are locked in place.

A similar water or beverage cooler is provided having retractable legs which have pads on their lower ends pulling the legs downward upon pushing buttons on handles on the sidewalls. Pushing the buttons act through linkages to open the locks to allow the legs to slide downward until they reach a locked, extended position. The legs may extend at angles similarly to those of the ice chest described above, or they may extend vertically downward. Beverage or water may be easily dispensed from the cooler with the legs in the locked extended position. The legs may be returned to their stored position by pushing the buttons to release the locks, and allowing the weight of the cooler to lower it toward the ground, the locks then locking the legs in the retracted position. If the weight is inadequate to lower the cooler, additional force may be applied downward on the handles. In the embodiment having vertical legs the cooler may be rectangular, square, or round in lateral cross section.

It is an aspect of the invention to provide improved elements and arrangements thereof for the purposes described which is inexpensive, dependable and fully effective in accomplishing its intended purposes.

These and other aspects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The ice chest of the present invention has retractable, telescoping legs extending at respective forward and rearward angles from each respective endwall of the ice chest. The ice chest has handles at the upper central portion of the ice chest sidewall having push buttons therein which release the telescoping legs from a locked position and which fall to the open position under their own weight and lock in a secure position. The push buttons actuate release of the locks through a linkage system. A similar water or beverage cooler is provided having retractable legs which have pads on their lower ends pulling the legs downward upon pushing buttons on handles on the sidewalls. Push buttons on the handles act through linkages to open locks to allow the legs to slide downward until they reach a locked, open position.

Figure 1:
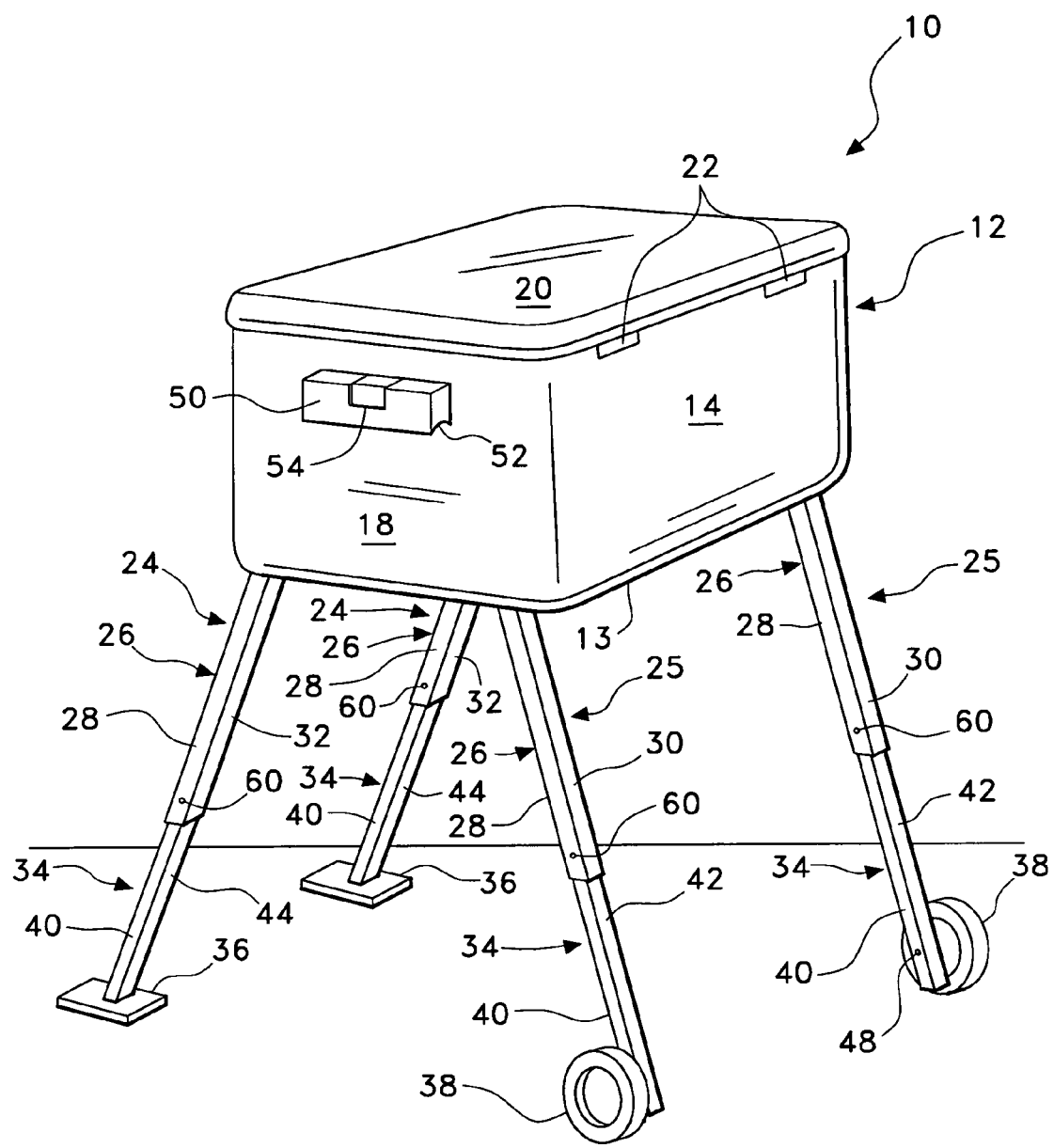
FIG. 1 is a perspective view of an ice chest with retractable legs in an extended position according to the present invention.

Referring to FIG. 1, there is shown an environmental, perspective view of the telescoping leg ice chest system of the present invention referred to by element No. 10 therein. Ice chest system 10 includes an ice chest 12 of conventional structure having a base wall 13, opposing front and rear walls 14, and opposing sidewalls 18 and having an openable lid 20. Openable lid 20 is attached to the rear wall 14 by hinges 22 as shown, however, ice chests which have completely removable lids 20 without hinges are equally useful in the present invention. Ice chest system 10 has front legs 24 and rear legs 25 extending from respective sidewalls 18 through leg apertures 23 (see FIG. 2) and are preferably of a square or rectangular cross section. As shown, front legs 24 extend at a forward angle and rear legs 25 extend at a rearward angle, thereby providing a larger support base or footprint than the size of the ice chest, however, front legs 24 and rear legs 25 may be vertically mounted in the structure of ice chest system 10 as desired (see FIG. 11).

Front legs 24 and rear legs 25 each have upper telescoping legs 26 having sidewalls 28, outer walls 30, and inner walls 32 and lower legs 34 telescoping downward from upper legs 26. The lower legs 34 of front legs 24 end in pads 36 and the lower legs 34 of rear legs 24 support wheels 38 at their lower ends. Pads 36, attached at the lower ends of lower legs 34 avoid sinking of the legs in soft ground and are also useful in providing weight to assist in extending the telescoping legs and to protect the ends of the legs from damage. Wheels 38 are attached at the lower ends of lower legs 34 at their base by axles 38, and allow easy movement of the ice chest 12 with legs extended to another location. Wheels 38 are also useful in providing weight to assist in extending the telescoping legs and protect the ends of the legs from damage. Additional pads 36 may be substituted for wheels 38 as desired.

Lower legs 34 are preferably rectangular and have sidewalls 40, outer walls 42, and inner walls 44. Handles 50 are provided on the central upper portion of each sidewall 18, rectangular handles 50 having concave finger grips 52 along their lower edges. Handles 50 each have leg release buttons 54, centrally located along the upper edges of handles 50 and are so configured as to allow a user to push the release buttons 54 while carrying ice chest 12 with handles 50 without setting the ice chest down on the floor or ground to erected ice chest system 10 for use. As shown, lower legs 34 are held in the extended position by spring loaded detents 60 of conventional design acting on the lower portions of upper legs 26. Single retracting legs may be employed with the ice chest of the present invention, however, the overall height of the system 10 would be limited.

Figure 2:
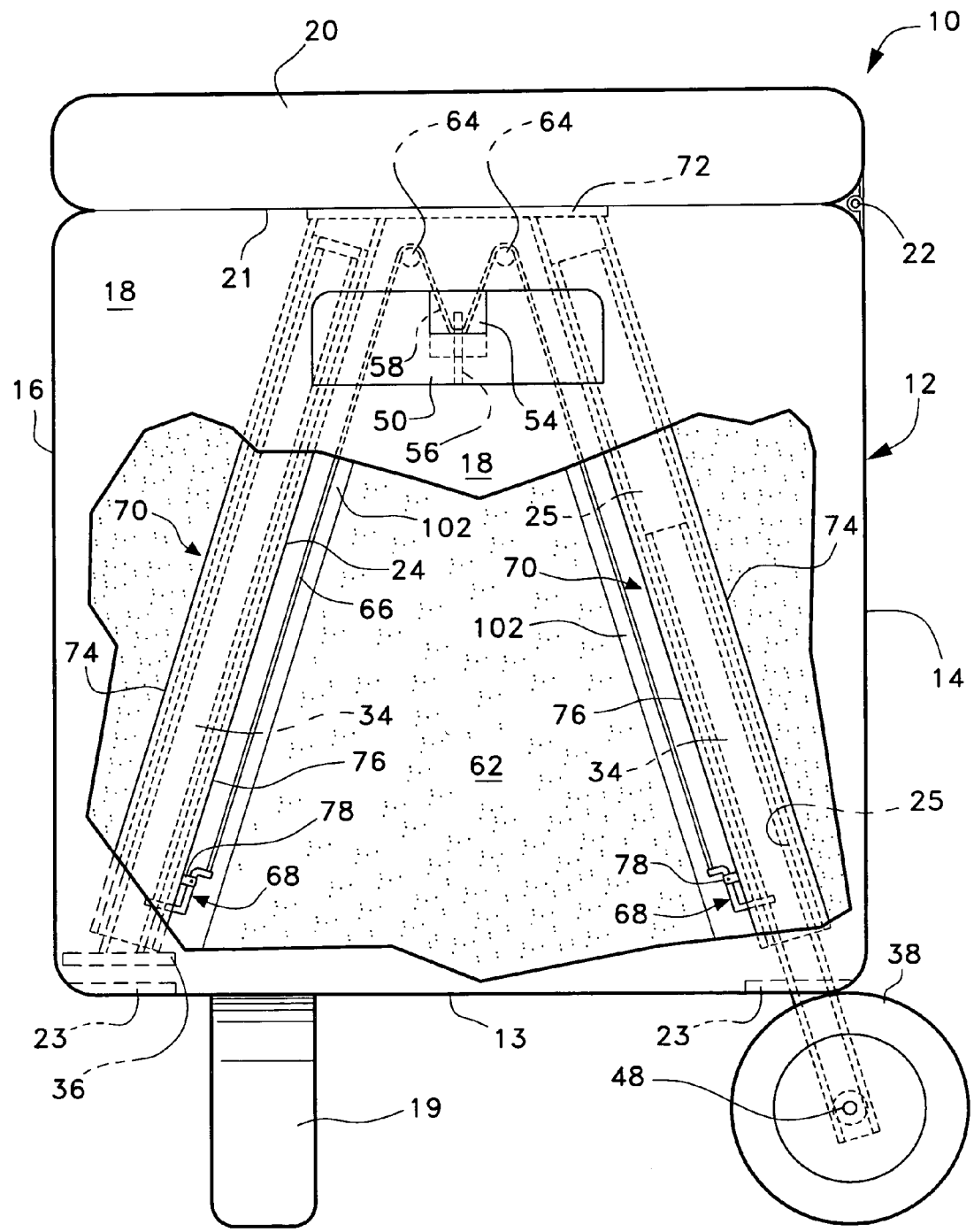
FIG. 2 is a side elevation view of the ice chest of FIG. 1 with the legs retracted and the outer sidewall partially broken away.

Referring to FIG. 2, there is shown a side elevation view, partially broken away, of the ice chest system 10 in the compact configuration with front legs 24 and rear legs 25 in the withdrawn position. In this configuration, wheel 38 extends below the base of the ice chest. A supporting leg 19 extends downward from the front portion of the base to allow the ice chest system 10 to sit level. Sidewall 18 is shown partially broken away, showing insulation 62 as is commonly used in the construction of an ice chest. Insulation 62 is cut away, showing inner wall 102, to accommodate the mechanical features of the telescoping legs and the linkage operated by leg release buttons 54.

Upper turning blocks 64 are supported between outer wall 18 and inner wall 102 and serve as pivots for release cable 66 which, upon pushing leg release button 54, releases upper leg locks 68 from lock receivers in upper legs 26 allowing the release of front legs 24 and rear legs 25. Turning blocks may be dowels, pulleys, or other equivalent structure as desired. Telescoping leg housings 70 are permanently affixed between outer sidewall 18 and inner sidewall 102, being connected at their upper ends to housing cap 72 which is a plate or the like secured at the upper central portion of sidewall 18 such as at the lip 21 formed at the upper edge of ice chest 12 where it meets lid 20. Each telescoping housing 70 has an outer side 74 and an inner side 76 and is preferably of rectangular or square cross section.

Front legs 24 and rear legs 25 are housed by leg housings 70 when in the retracted position, leg housings 70 serving as guides for legs 24 and 25 when released to the extended position. Leg lock supports 78 are located proximate the lower ends of housings 70 and pivotally support leg locks 68. With legs 24 and 25 in the retracted position, leg locks 68 extend through key holes 92 (see FIG. 4) in housing inner sides 76, serving as lock receivers, front legs 24 including lower legs 34, and rear legs 25 including lower legs 34 as shown. For clarity, detents 60 are not shown in FIG. 2. Apertures 23 in the base of the ice chest provide for extension of legs 24 and 25 from the unit.

Figure 3:
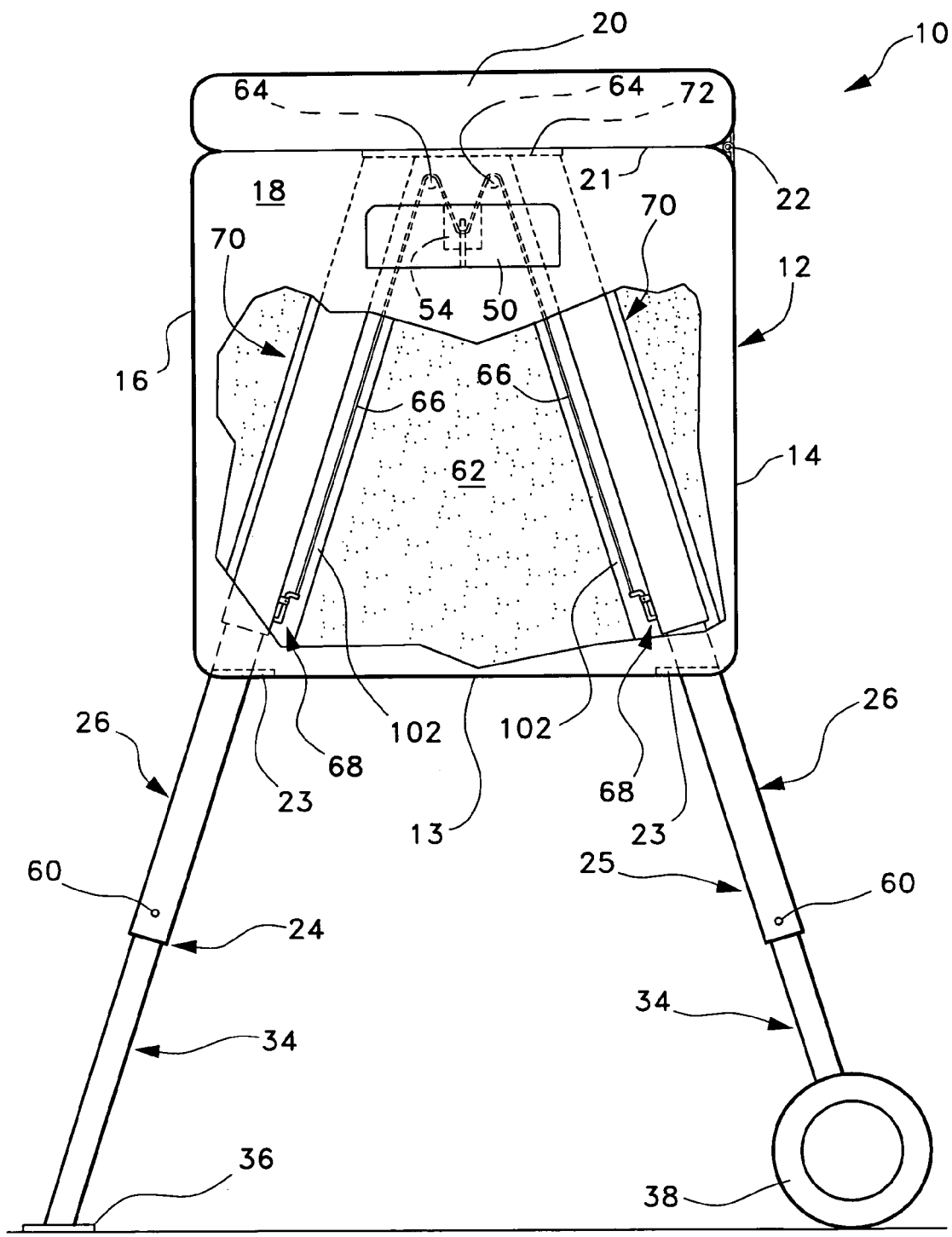
FIG. 3 is a side elevation view, partially broken away, similar to that of FIG. 2 with the legs in an extended position.

Referring to FIG. 3, there is shown a side elevation view similar to that of FIG. 2, with the upper telescoping legs 26 and the lower legs 34 extended into the upright locked position. As is seen, the upper legs 26 are locked in the extended position by leg locks 68 and lower legs 34 are locked in place by detents 60. It is noted that the leg housings 70 remain in a fixed position relative to the wall 18 of ice chest 12. Details of the leg locks 68 are shown in FIGS. 4 and 5, described below.

Figure 4:
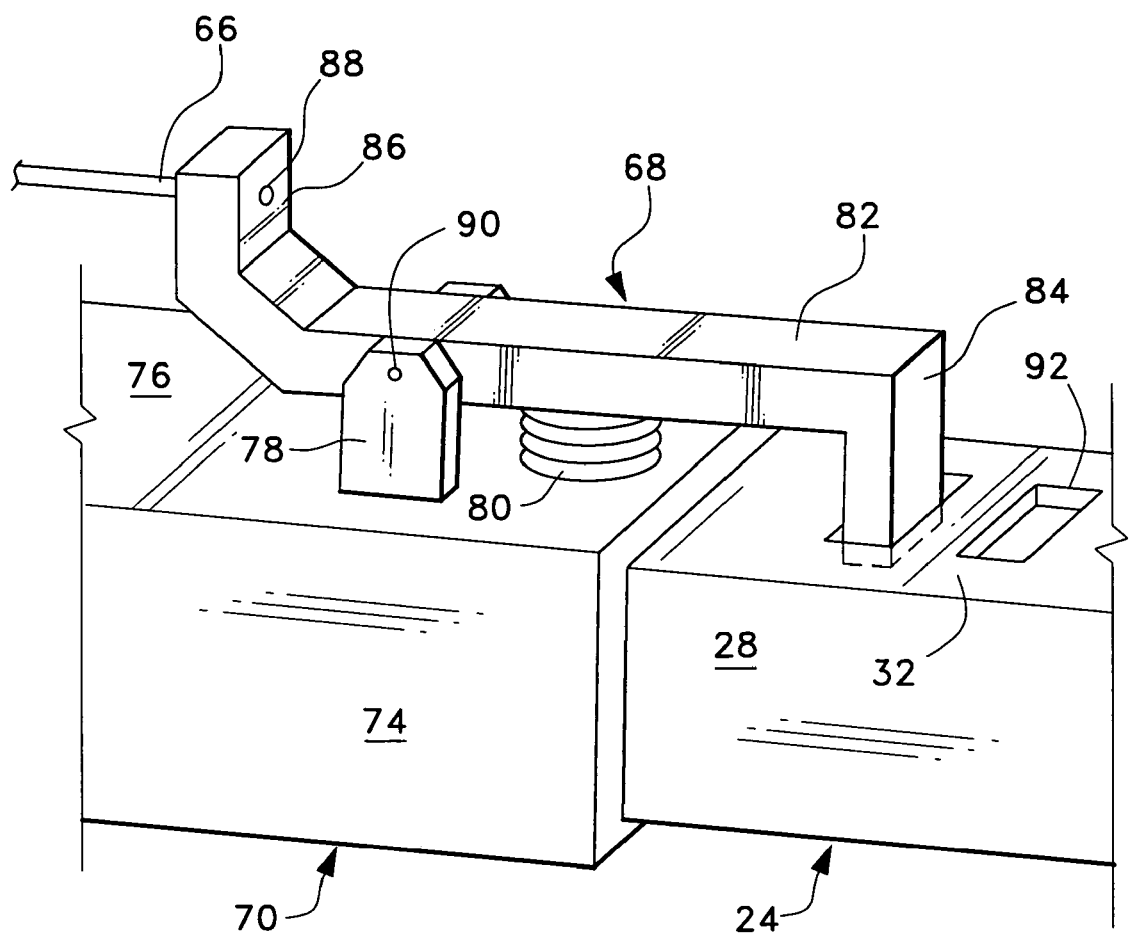
FIG. 4 is a detail view of the leg lock of the present invention in the locked position.
Figure 5:
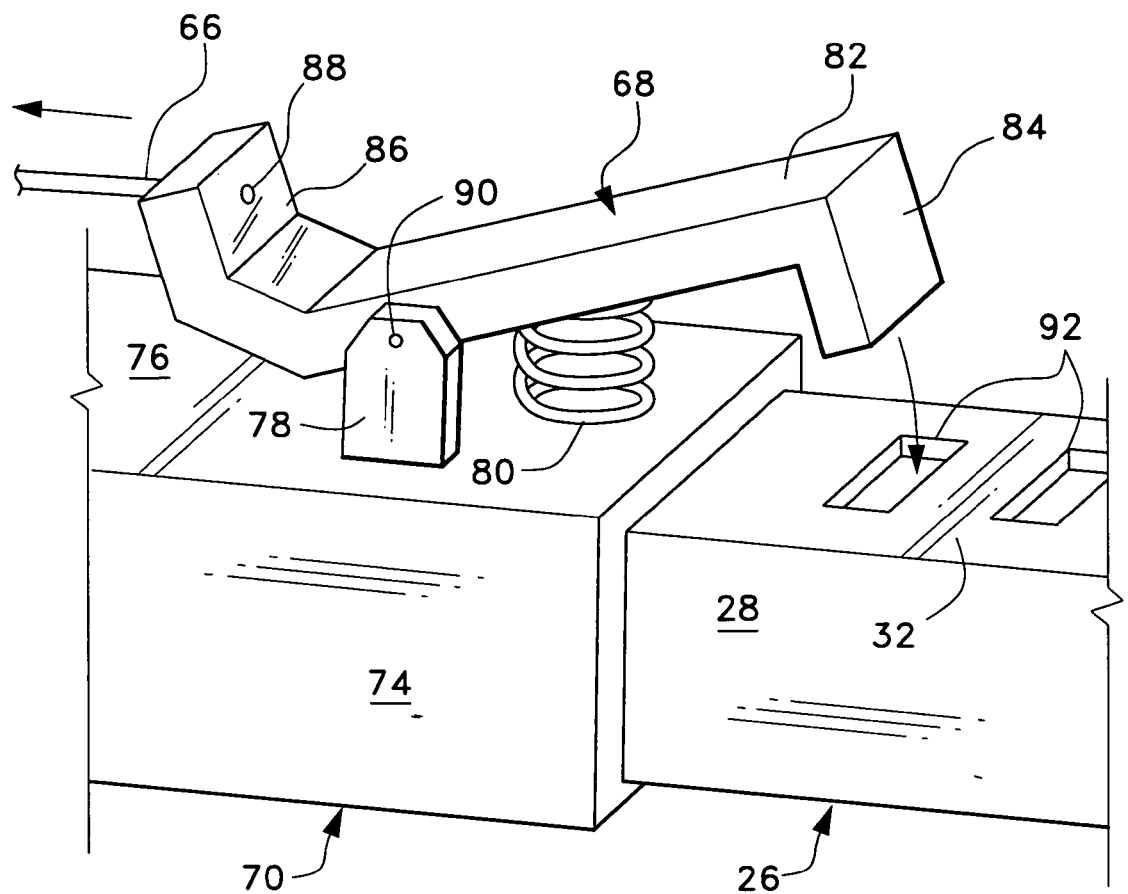
FIG. 5 is a detail view of the leg lock of the present invention in the open position.

Referring to FIGS. 4 and 5, leg lock 68 is mounted on the inner side 76 of leg housing 70 by means of pivotal leg lock supports 78 and held by lock pivot pin 90. Leg lock 68 has a pivoting locking arm 82 having lock engagement key 84 at its lower end fitting into a selected key hole 92. Lock arm 82 extends upward to form an inner extending lever arm 86 which receives release cable 66 at cable connection 88. An extension spring 80 is located between leg housing 70 and lock arm 82, maintaining lock engagement key 84 engaged in a key hole 92 (note that although engagement key 84 is shown in only the upper portion of legs 24, the engagement key 84 also engages the lower legs 34 when in the retracted position as see FIG. 2.

As seen in FIG. 5, pulling force applied by release cables 66 (upon pushing button 54 of FIG. 2) rotates lock arm 82 upward at its lower end against the pull of tension spring 80, pulling lock engagement key 84 away from key hole 92, allowing legs 26 and 34 (see FIG. 2) to telescope outward or be withdrawn inward as desired. Upon release of tension force on release cables 66, lock engagement key 84 returns to the engagement position against upper leg 26. A compression spring may be substituted for tension spring 80 if the spring is moved to the opposite side of support 78 and located between housing 70 and lock arm 82 as desired.

Figure 6:
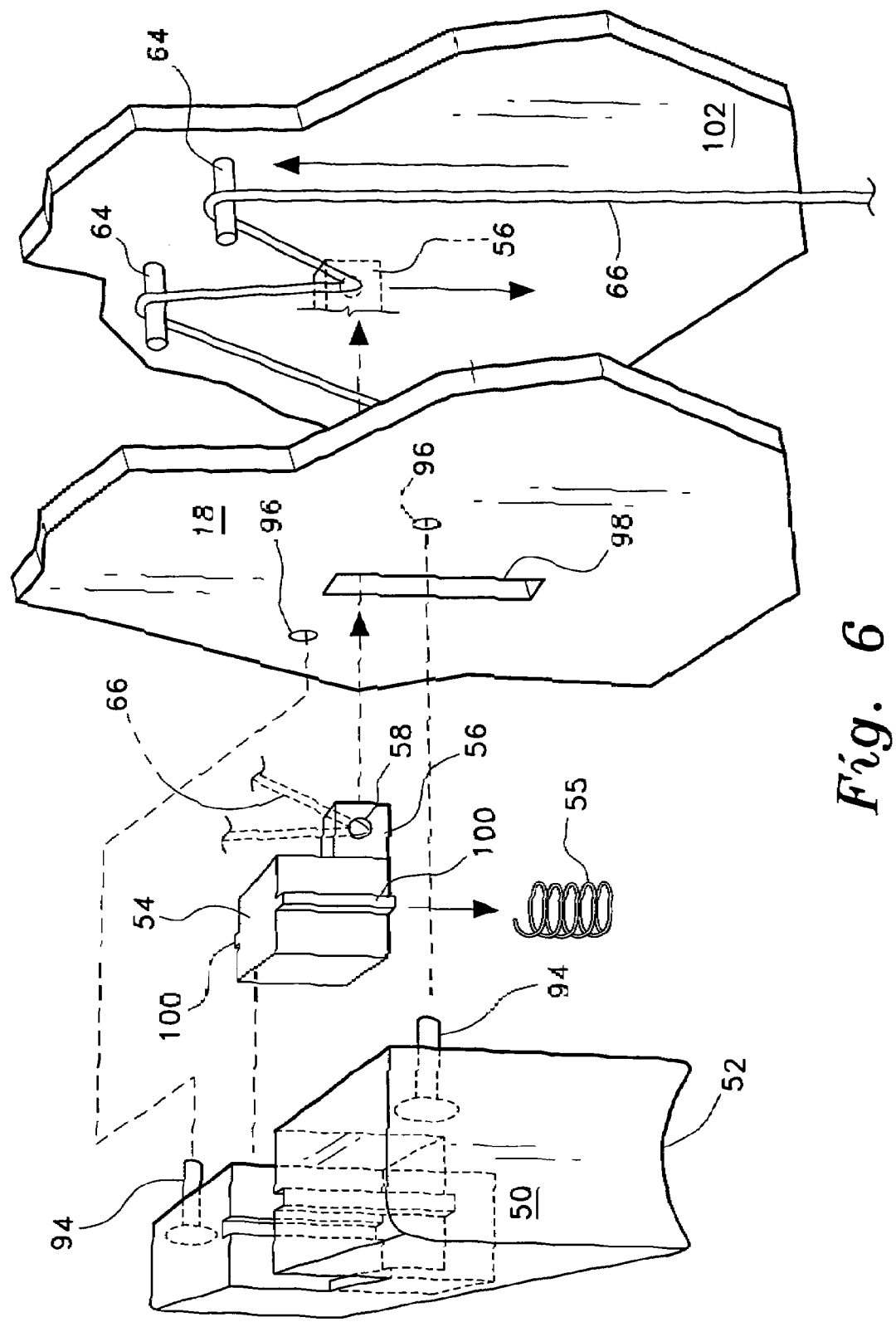
FIG. 6 is a detail exploded view of the handle, push button, and linkage for operating the lock of FIG. 4.

Referring to FIG. 6, there is shown an exploded detail view of the handle and upper leg release mechanisms wherein generally rectangular handle 50 has concave finger grips 52 at its lower end. Leg release button 54 has vertical release button guides 100 on opposed sides thereof which slidingly fit in corresponding grooves in the upper central button receiving portion of handle 50. A compression coil spring 55 is located in handle 50 below leg release button 100 to assist in the return of button 54 in its rest position.

An actuator button bracket 56 extends rearwardly from the central lower rear portion of leg release button 54 having an actuator bore 58 for receiving release cable 66, actuator button bracket 56, upon assembly, being inserted through a vertical actuator slot 98 in sidewall 18 so as to move upward and downward therein before insertion of release cable 66 therethrough. As button 54 is pressed downwardly, bracket 56 pulls release cable 66 downward between turning blocks 64, spaced upward and outward therefrom, thereby pulling the release cable portions which extend downward to leg locks 68 from turning blocks 64 upward, releasing the leg locks 68. The actuator button bracket 56, release cable 66, and turning blocks 64 (shown as dowels) are located between sidewall 18 and inner wall 102. Rivets 94 attach the assembled handle 50 to sidewall 96 through rivet receiving bores 96.

Figure 7:
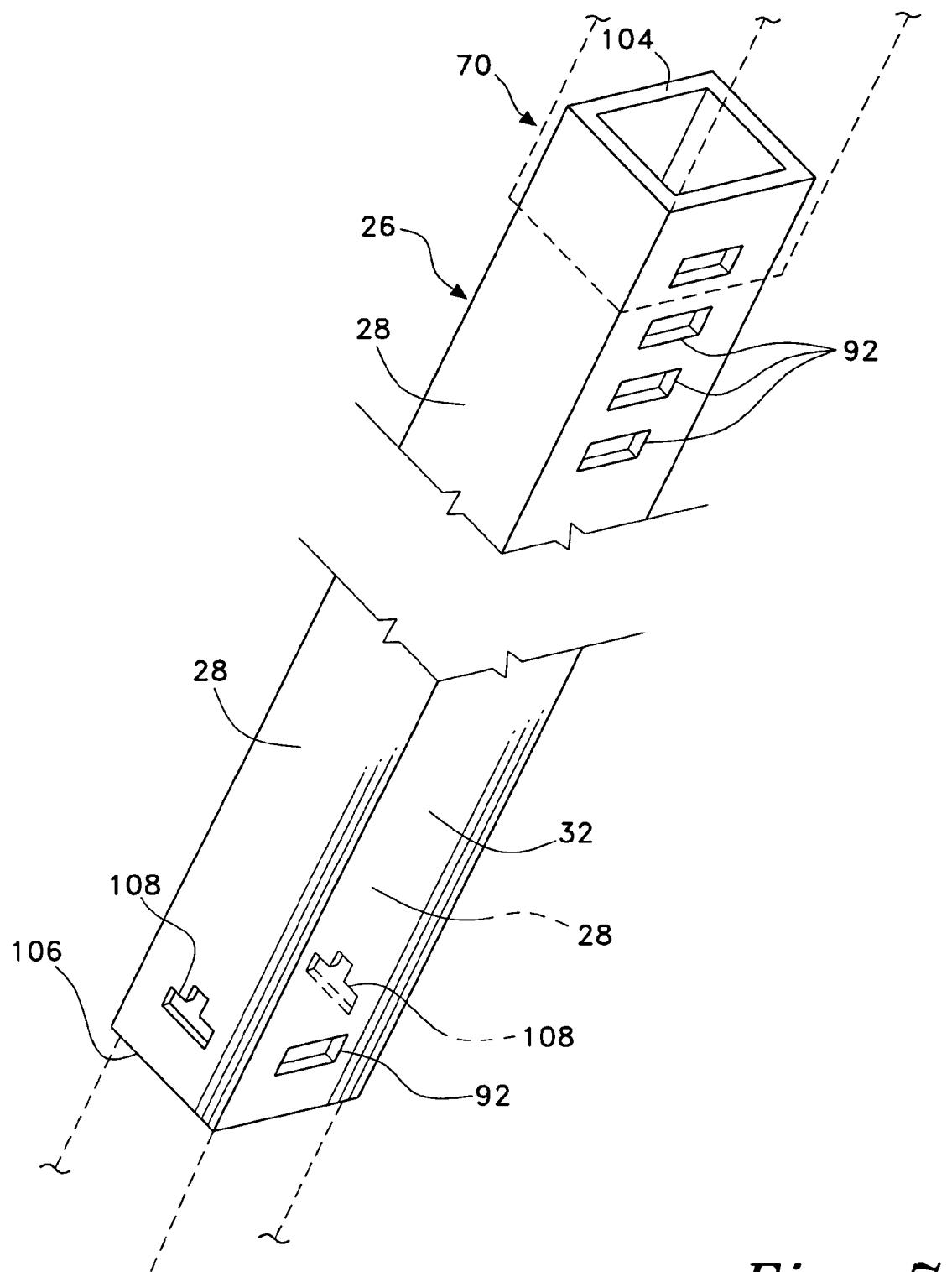
FIG. 7 is a detail view of an upper leg of the invention of FIG. 1.
Figure 8A:
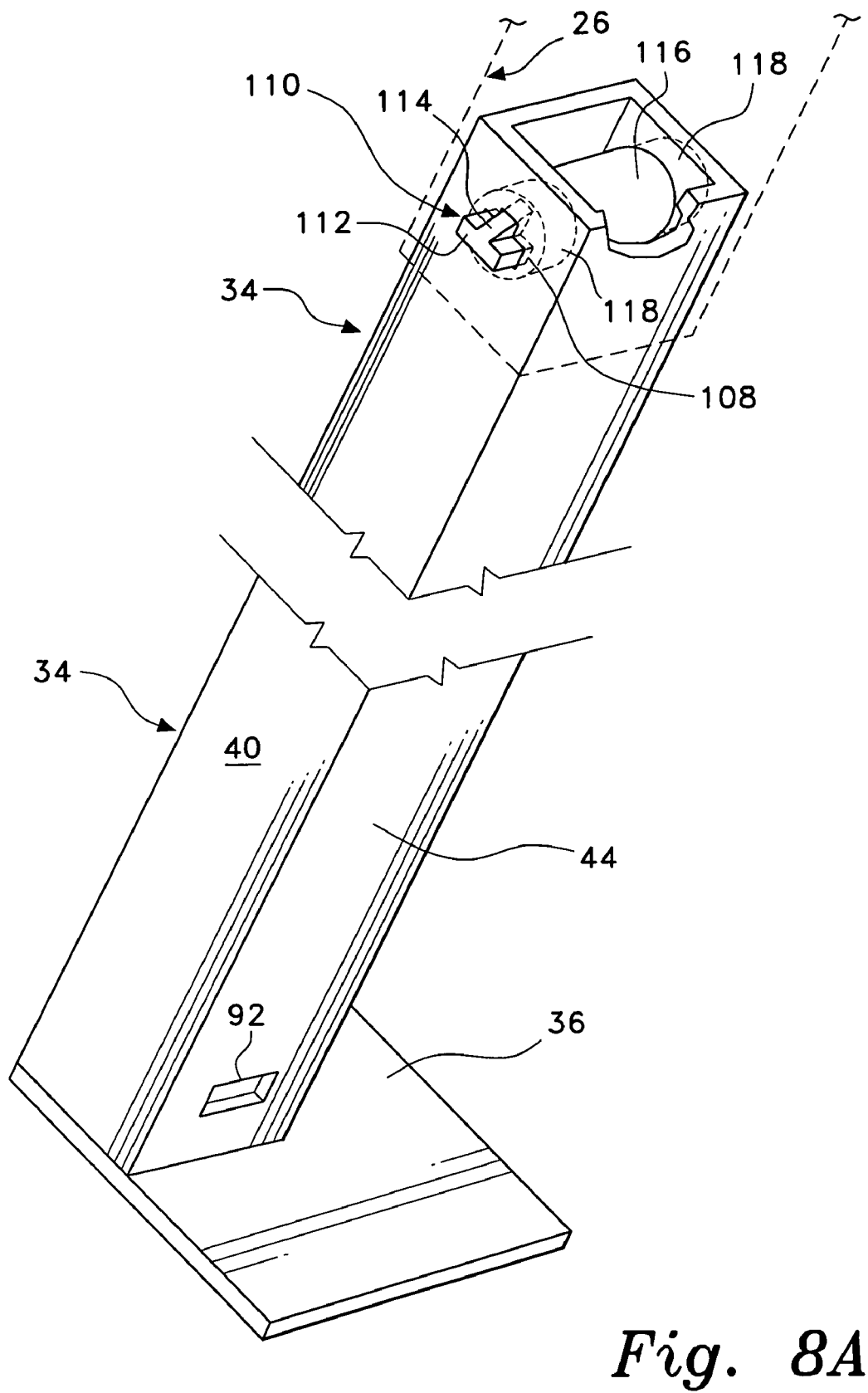
FIG. 8A is a detail view of a lower telescoping leg of the invention having a pad mounted thereon.
Figure 8B:
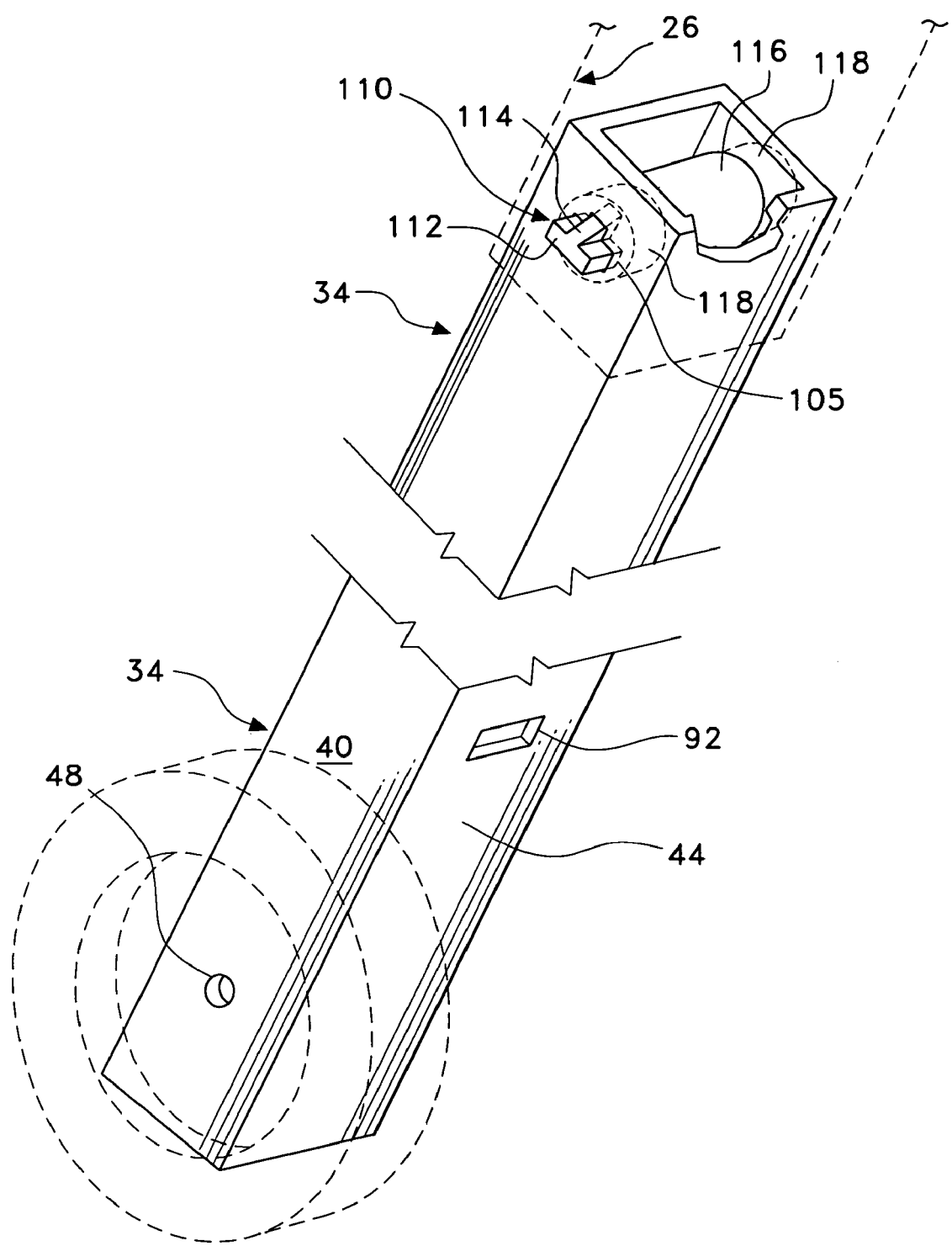
FIG. 8B is a detail view of a lower telescoping leg of the invention having a wheel mounted thereon.
Figure 8C:
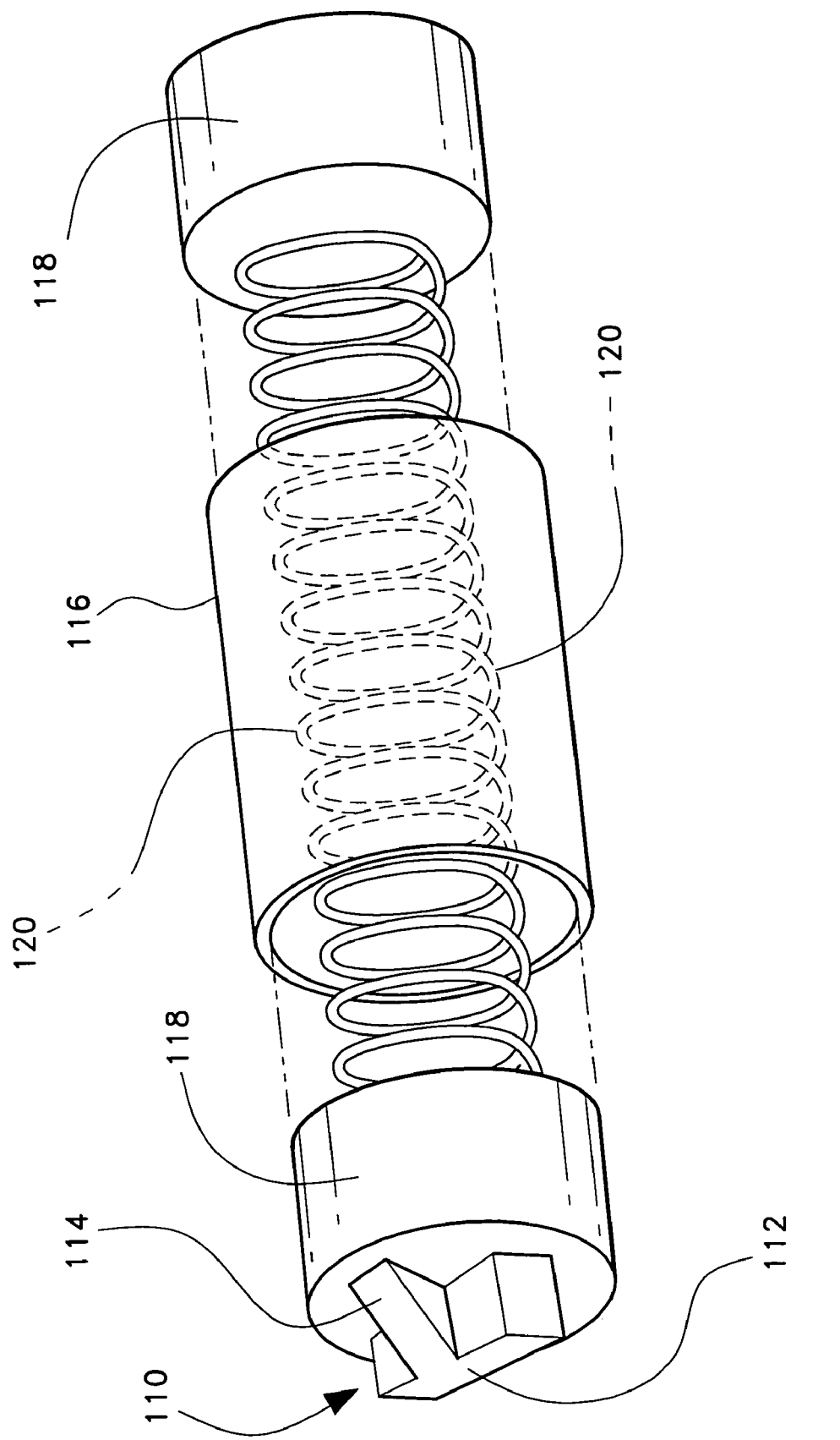
FIG. 8C is a detail view of a detent device of the present invention.

Referring to FIGS. 7-8C, there is shown a detail view of an upper telescoping leg 26 and lower telescoping leg 34 as extended from leg housing 70 and showing an inverted "T"-shaped detent system particularly useful with the present invention. A plurality of key holes 92 may be aligned along the inner wall 32 proximate the upper end 104 of upper telescoping leg 26 to allow adjustment of the standing height of the ice chest system 10 (see FIG. 1). A lower key hole 92 is located proximate the lower end 106 for maintaining upper leg 26 in a collapsed, stored position. Opposed inverted "T"-shaped detent receiver 108 is shown located in corresponding sidewalls 28 of upper telescoping leg 26 proximate its lower end 106. As seen in FIG. 8A, the inner side 44 of the pad version of lower leg 34 has a key hole 92 proximate lower pad 36 for maintaining lower telescoping leg 34 in a collapsed, stored position.

As seen in FIG. 8B, the inner side 44 of the wheeled version of lower leg 34 has a key hole 92 proximate the upper reach of the wheel 38 (see FIG. 1) for maintaining lower telescoping leg 34 in a collapsed, stored position (see FIG. 2). The upper end of lower leg 34 is shown partially broken away and inserted into upper telescoping leg 26 as shown in ghost lines and locked in place by inverted "T"-shaped detent 110 as inserted through detent receiver 108 of upper leg 26. Detents 110 have a elongated, rectangular base 112 having square sides 105 and an inward, upward sloping upper portion 114 attached to detent back plates 118 which are free to slide within cylindrical detent spring and back plate case 116. Case 116 extends between the opposed lower leg sidewalls 40 and has a compression spring 120 concentric within its wall as shown in the exploded view of FIG. 8C. The compression spring 120 exerts outward pressure against both detent back plates 118 forcing detents 110 into opposed detent receivers 108 (see FIG. 7), thereby maintaining lower leg 34 is a locked, extended position. Additional downward pressure on the system 10 exerted by the user forces sloping upper portion 114 to pull detents 110 inward to the retracted position, allowing retraction of lower leg 34 into upper leg 26.

Figure 9A:
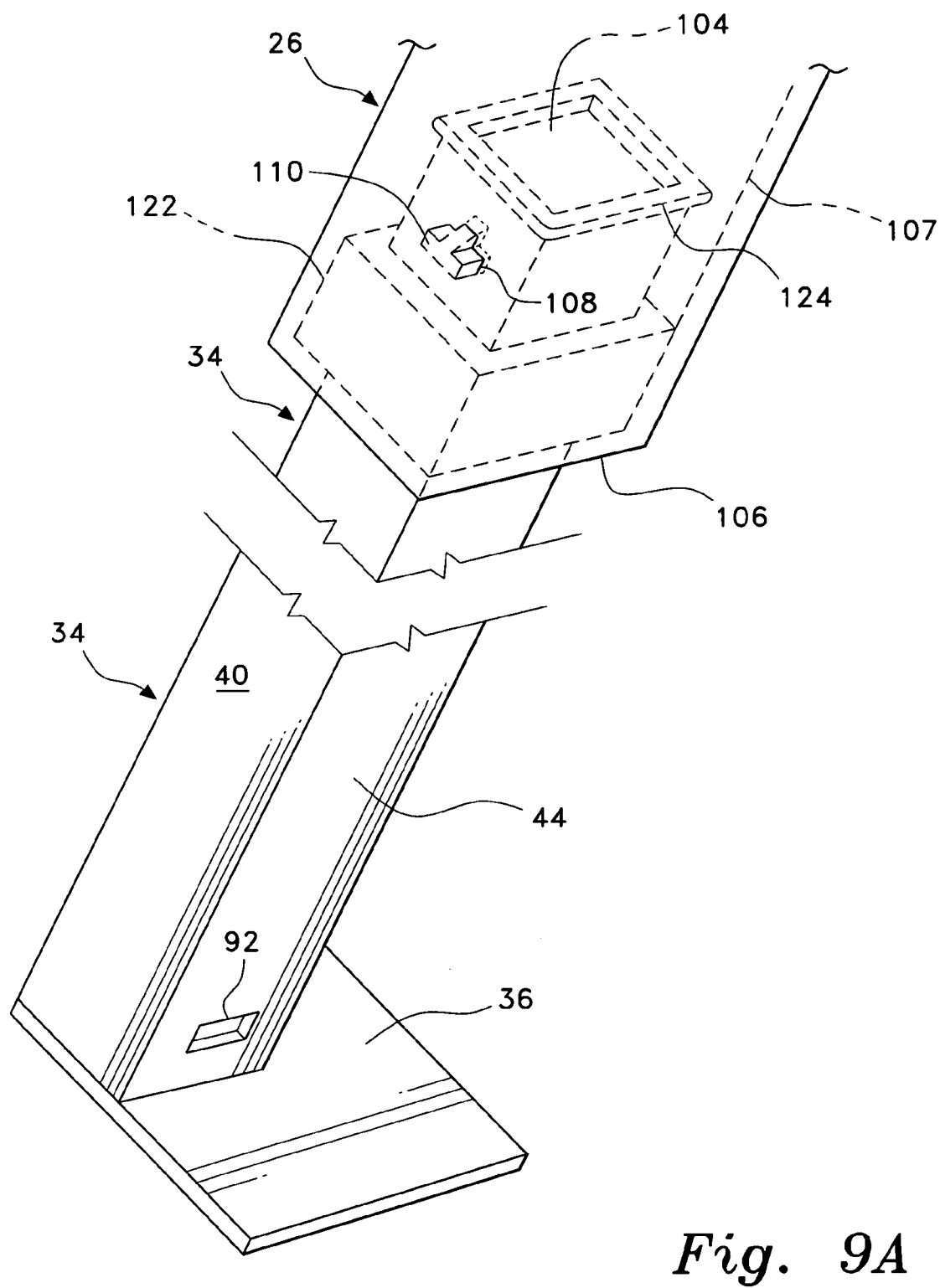
FIG. 9A is a detail view of the lower telescoping leg of the present invention as in FIG. 8A and illustrating the spacer and lip connection with the upper leg.
Figure 9B:
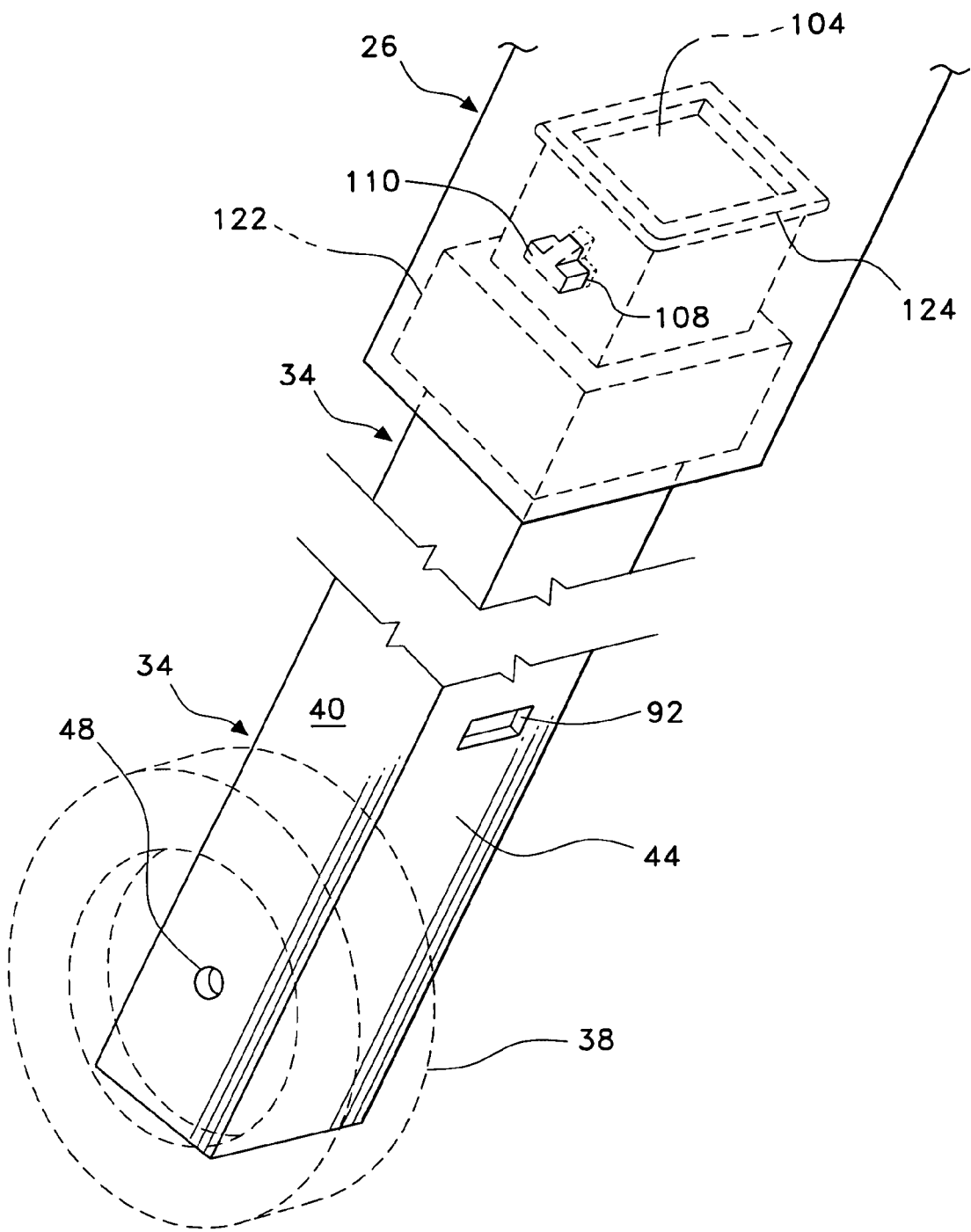
FIG. 9B is a detail view of the lower telescoping leg of the present invention as in FIG. 8B, illustrating the spacer and lip connection with the upper leg.
Figure 12:
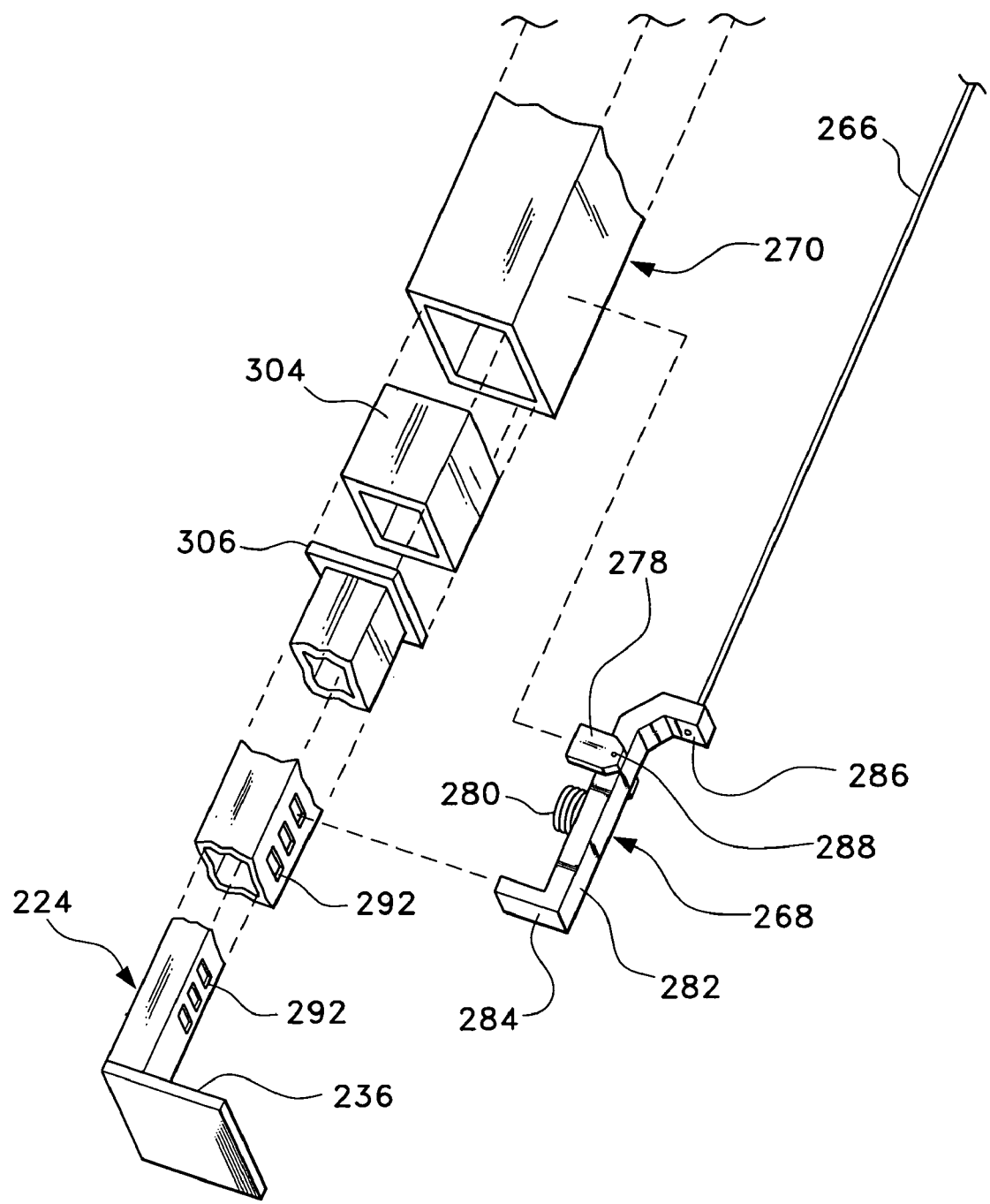
FIG. 12 is an exploded, detail view of the retractable leg and locking mechanism of FIGS. 10 and 11.

Referring to FIGS. 9A-9B, there are shown detail perspective view of the front leg version and the rear leg version of lower telescoping lower leg 34 showing an additional feature of the sliding connection between lower leg 34 and upper leg 26 as shown in the extended locked position. Upper leg 26 has a rectangular retaining sleeve 122 permanently attached within its inner wall 107 at its lower end 106 and spaced below detent receiver 108. Lower leg 34 has a stop lip 124 surrounding its upper end 104. Retaining sleeve 122 is preferably made of a plastic material which having dimensions which allows the lower leg 34 to smoothly travel therethrough. Lower leg stop lip 124 extends outward from the upper edge of lower leg 34 so as to lodge against retaining sleeve 122 if detent 110 fails to engage detent receiver 108, thereby keeping lower leg 34 from falling out of upper leg 26. A similar retaining sleeve may be mounted in the lower end of housing 70 with a stop lip on the upper end of upper leg 26 as illustrated in FIG. 12 in connection with the cooler 200.

In operation, a person carrying ice chest 12 by handles 50 presses leg release buttons 54, which pull release cables 66, opening leg locks 68. The weight of pads 36 on front legs 24 allow the upper and lower telescoping legs 26 and 34 to slide to the fully extended position where lock 68 locks into key holes 92 of upper legs 26 and detents 110 of lower legs 34 snap into detent receivers 108 of upper legs 26. In like manner, the weight of wheels 38 on rear legs 25 allow the upper and lower telescoping legs 26 and 34 to slide to the fully extended position where lock 68 locks into key holes 92 of upper legs 26 and detents 110 of lower legs 34 snap into detent receivers 108 of upper legs 26. The ice chest system 10 may then be easily moved by means of wheels 38. The height may be adjusted by pushing the buttons 54, which release the lock engagement keys 84 from the lowermost key holes 92 and allow the legs to slide further until a higher key hole 92 is reached and engaged by lock engagement keys 84.

To collapse the legs 24 and 25 back into the ice chest 12, pressure is exerted downward on the handles 50 and lock release buttons 54 pushed. The locks 68 are released, allowing the ice chest to descend as upper legs 26 collapse into leg housings 70. The ice chest is then pressed downward until the spring pressure of detent spring 120 is overcome and detents 100 slide into a retracted position along the sloped portion 114 of the inverted "T", allowing the lower legs 34 to be collapsed into upper legs 26. The engagement keys 84 of locks 68 then engage the lower key holes 92 of upper legs 26 and lower legs 34, respectively. The ice chest is then secure for carrying and compact storage.

Figure 10:
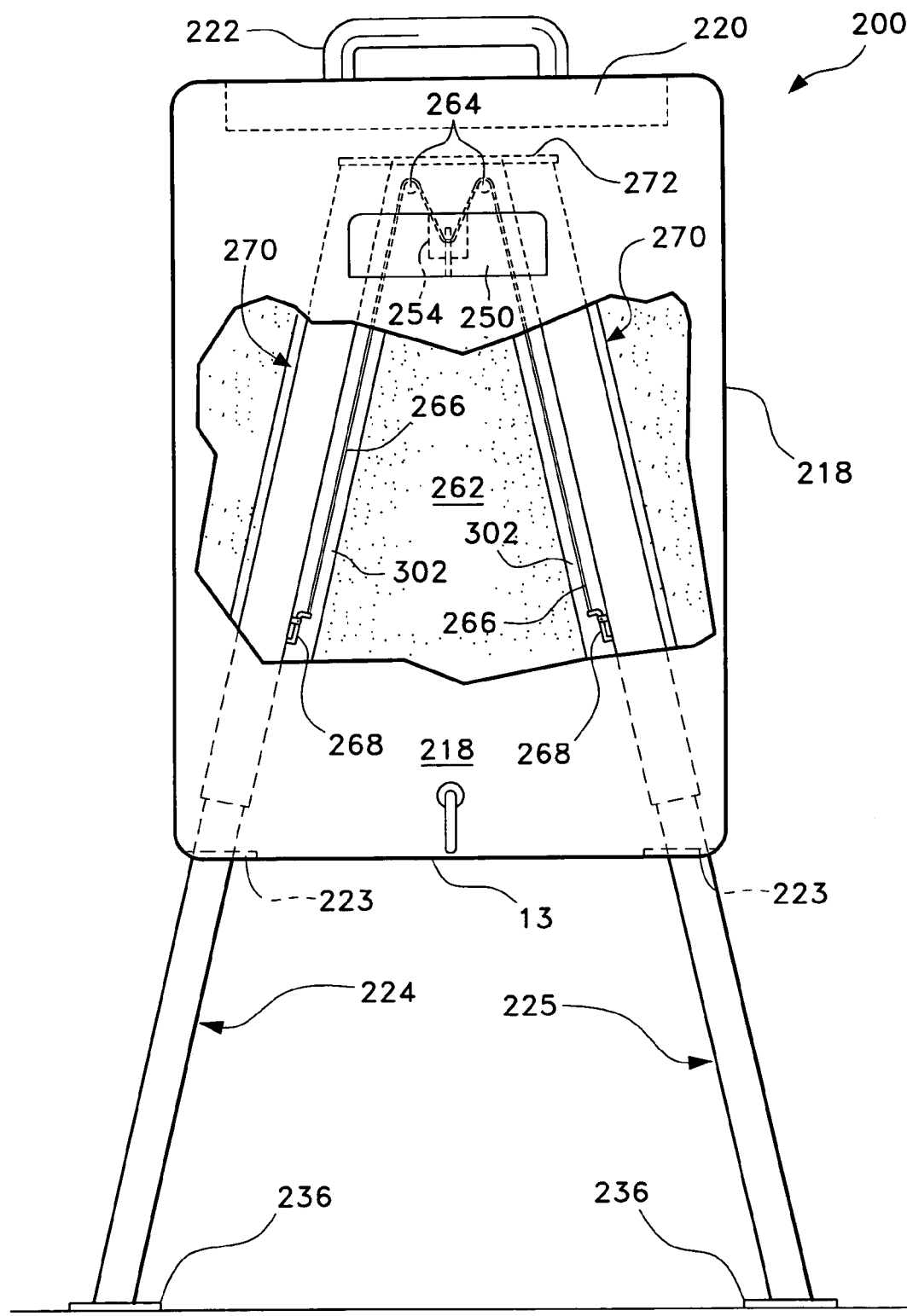
FIG. 10 is a side elevation view partially broken away showing a cooler according to the present invention.

Referring to FIG. 10, there is shown a front elevation view partially broken away of a cooler 200 for dispensing water or beverages. The cooler 200 is generally square in horizontal cross section and has flat, vertical sides as shown. Cooler 200 is similar in configuration to the ice chest of FIGS. 1-3 with the exception the cooler 200 is of greater height relative to the width of its sides and has single retractable legs 224. Cooler 200 has a removable lid 220 having a handle 222 for easy removal.

Cooler 200 in this version has four outer walls 218, the side walls as shown retractable front legs 224 and rear legs 225 each having pads 236 at their respective lower ends set at angles so as to sit flat against a supporting surface such as the ground. Legs 224 and 225 are retractable into leg housings 270 through apertures 223 and are set at angles such as to extend from the upper central portion of the front of cooler 200 at cap plate 272. Opposed handles 250 have leg release buttons 254 which operate locks 268 through a linkage identical to that of the ice chest of FIG. 3, cable 266 extending from locks 268 over turning blocks 264 located above and spaced outwardly from leg release button 254. Cooler 200 has inner walls 302 spaced from outer walls 218 and having insulating foam 262 filling the space therebetween.

As shown in FIG. 10, parts of foam filling 262 have been cut away so as to house leg housings 270, cable 266, and the linkage associated with leg release button 254 (see FIG. 3). Apertures 223 in the base of the cooler provide for extension of legs 224 and 225 from the unit. The respective inner sides of legs 224 and 225 have upper key holes and lower key holes similar to the upper legs 26 and 34 as seen in FIG. 7, however no detent openings are required and pads 236 are located at each lower end thereof.

In operation, the user grips handles 250 and pushes leg release buttons 254 downward, releasing locks 268 mounted on leg housings 270, allowing legs 224 and 225 to extend downward and outward under their own weight until the upper key holes are engaged, locking the legs in place in the manner of the ice chest system of FIG. 3. The legs 224 and 225 may be retracted into housings 270 by reversing the above procedure, the pads 236 being even with the base of cooler 200.

Figure 11:
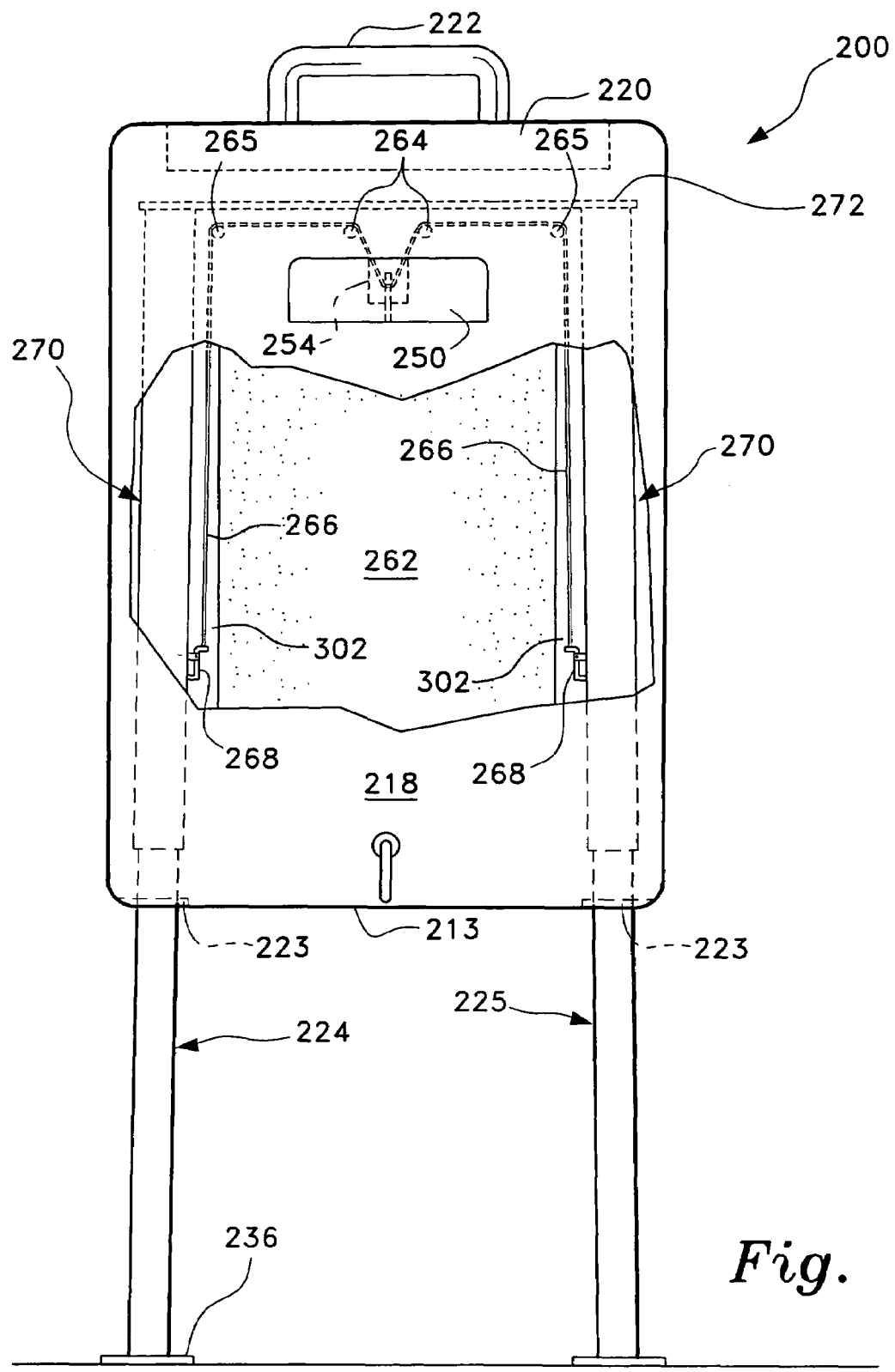
FIG. 11 is a side elevation view partially broken away showing the cooler of FIG. 10 with vertically traveling legs.

Referring to FIG. 11, there is shown a side elevation, partially broken away, view of another embodiment of the cooler of FIG. 10 wherein the leg housings 270 and the retractable legs 224 and 225 are vertically disposed. This embodiment is identical to that of FIG. 11 with the exception that an additional pair of turning blocks 265 (shown as dowels) are spaced laterally outward from turning blocks 264 and fixed between outer wall 218 and inner wall 302. This allows the housing cap 272 to be laterally extended and leg housings 270 to be substantially separated at their respective top ends while keeping the release cables 266 close to the leg housing structure, minimizing the amount of insulation 262 which must be removed for operation of the leg release linkage. This embodiment also allows for direct releasing force to be applied to the locks 268 parallel to housings 270, maximizing the leverage on the locks 268 in releasing legs 224 and 225.

The cooler 200 of the embodiment of FIG. 11 may be rectangular, square, or round in lateral cross section. In the case of a round cooler, the housing cap 272 is in the shape of an arc and release cables 266 extend around and against the portions of inner wall 302 between turning blocks 264 and 265, respectively.

Referring to FIG. 12, there is shown an exploded view of a leg 224 and lock 268 of FIG. 11 in an embodiment similar to that of FIG. 9A and 9B wherein housing 270 has a retaining sleeve 304 located at the lower end thereof along its inner wall, and leg 224 (or 225) has a stop lip 306 extending outward from its upper edge such that if, upon release of leg 224 from the lower key holes 292, by lock engagement key 284 mounted on lock arm 282 of lock 268 extension spring 280 fails to pull lock engagement key 284 into the upper set of key holes 292, stop 306 will engage retaining sleeve 304, thereby maintaining the end of leg 224 within housing 270, thus, avoiding it falling off the cooler. Retaining sleeve 304 is preferably made of plastic and provides for smooth operation of the leg 224. Lock 268 operates identically to lock 68 of FIGS. 4 and 6, wherein, upon pulling release cable 266 upward, as attached to lock lever arm 286, lock arm 282 is rotated outward around pivot 288 in lock support 278 as mounted on the inner side of housing 270.

Operation of the cooler 200 is similar to that of ice chest system 10, the exception being that no telescoping lower legs or detents are required. The preferred material for the inner and outer walls and lids is sheet plastic with rigid plastic foam insulation as is commonly used in construction of these items. The walls and lid may be of sheet metal as desired, however, a rigid form of insulation is preferred to avoid interference with the operating mechanisms. Telescoping upper and lower legs as described with the ice chest system 10 may be employed in the cooler systems 200, as desired, however, the additional length provided thereby is generally not required.

It is to be understood that the present invention is not limited to the embodiments described above, but encompasses any and all embodiments within the scope of the following claims.

We claim:

1. An ice chest or cooler having locking retractable legs comprising:
    an insulated container having an outer wall, an inner wall, and insulation therebetween and defining a sidewall having an upper portion having an upper lip and a basewall;
    a plurality of retractable legs each having upper ends, lower ends, and being extendable generally downward from said basewall at said sidewall through apertures therein between a retracted position substantially within said sidewall between said outer wall and said inner wall and at least one extended position;
    a leg lock corresponding to each said retractable leg proximate said base of said insulated container;
    at least one leg lock receiver located in and proximate said upper end and in said lower end of each said retractable legs;
    a guide for each said retractable leg located between said outer wall and said inner wall;
    a pair of opposed handles located on the upper portion of said sidewall for carrying said container;
    each said handle having a lock release actuator proximate said handle;
    each said lock release actuator being so located as to be manipulated by a user while carrying said container by said handles; and
    a linkage between said lock release actuator and said lock;
    whereby, upon a user carrying said container by said handles, said release actuators may be manipulated so as to act on said linkage, thereby releasing said leg locks from engagement with said lower lock receivers of said legs, said legs descending upon release by the force of their weight to an extended position upon which said lock engages its respective upper lock receiver, thereby locking said legs in an extended position for convenient use; and whereby said legs may be retracted by manipulating said release actuators, which act on said linkage and release said leg lock from said upper lock receiver and allowing said container to descend by its own weight or by the user pushing downward on said container or said handles until said lock engages its respective lower lock receiver, thereby locking said legs in a retracted position.

2. The ice chest or cooler of claim 1, further comprising an openable or removable lid engaging said container upper lip.

3. The ice chest or cooler of claim 1, wherein said container is generally rectangular, having a front wall, a rear wall, and opposed sidewalls, each said opposed sidewalls having front and rear retractable legs located therein for extension and retraction.

4. The ice chest or cooler of claim 3, wherein said handles have an upper edge and a lower edge and are located on said opposed sidewalls, extending outward therefrom and said lock release actuators are release buttons located along said handle upper edge so located as to be manipulated by a user from a rest position to an actuated position, said linkage being connected with said button so as to open said leg locks, said leg lock being spring-biased to the closed position relative to said lock receivers.

5. The ice chest or cooler of claim 4, further comprising a housing cap located above each said handle proximate said container lip, and wherein said guides are leg housings having an upper end and a lower end and extend downward from said housing cap and extending downward and outward to points proximate said apertures, said retractable legs being slideably located within said leg housings for extension through said apertures, said front legs extending outward, forward of said front wall, said rear legs extending outward, rearward of said rear wall.

6. The ice chest or cooler of claim 5, said front legs having pads mounted at their lower ends, said rear legs having one of pads or wheels mounted at their respective lower ends.

7. The ice chest or cooler of claim 6, each said plurality of legs being telescoping legs having an upper leg having an upper end and a lower end and slideably mounted within a respective leg housing, and a lower leg having an upper end and a lower end and slideably mounted within a respective said upper leg, said pad or wheel being mounted at said lower end of said lower leg.

8. The ice chest or cooler of claim 7, each said upper leg having an inner side having at least one lock receiver proximate said upper end and at least one lock receiver proximate said lower end thereof, each said lock receiver being in the form of a key hole defined by said upper leg.

9. The ice chest or cooler of claim 8, each said upper leg having opposed sides having opposed detent receivers proximate said lower end thereof.

10. The ice chest or cooler of claim 9, each said lower leg having opposed sides having opposed detents proximate said upper end thereof, said detents being configured to engage said detent receivers of said upper leg.

11. The ice chest or cooler of claim 10, each said detent and said engaging detent receiver having the shape of an inverted "T" having a vertical portion and a horizontal cross portion, said vertical portion sloping upward and inward from the horizontal cross portion thereof, each said detent having a back plate which is being spring loaded.

12. The ice chest or cooler of claim 4, further comprising a housing cap located above each said handle proximate said container lip, and wherein said guides are leg housings having an upper end and a lower end and extend downward from said housing cap and extending downward to points proximate said apertures, said retractable legs being slideably located within said leg housings for extension through said apertures, said front legs and said rear legs extending downward.

13. The ice chest or cooler of claim 12, said outer wall defining a vertical actuator slot therein, said leg release button having mounted for vertical travel within said handle, said leg release button having a bracket extending through said slot, said bracket defining a horizontal actuator bore therethrough, said linkage comprising a release cable having opposed ends and at least first and second turning blocks spaced above and to opposite sides of said release button and bracket, said release cable extending from a front said leg lock, over said first turning block, downward and through said horizontal actuator bore, upward and over said second turning block, and downward to a rear said leg lock, whereby, upon pressing said leg release button downward, said bracket pulls downward on said release cable, thereby pulling said release cable inward over said first and second turning blocks and thereby exerting upward force on said leg locks, releasing said leg locks from said lock receivers.

14. The ice chest or cooler of claim 13, said leg locks being mounted proximate said lower end of said leg housings on an inner side thereof, each said retractable legs having an inner side having at least one lock receiver proximate said upper end thereof and at least one lock receiver proximate said lower end thereof.

15. The ice chest or cooler of claim 14, said leg locks having lock engagement keys and said lock receivers being key holes defined by said retractable leg, said engagement keys engaging said lock engagement keys, said engagement keys being removed from said key holes upon upward force being applied to said leg locks by said release cable, thereby releasing said retractable leg for extension or retraction.

16. The ice chest or cooler of claim 15, wherein said leg locks include a lock arm mounted for rotation by means of a lock pivot pin between let lock supports mounted on said leg housing, said lock arm having a lock lever arm extending upward and outward from said lock arm above said pivot pin and engaging said release cable, said lock arm having a said lock engagement key extending outward below said pivot pin so as to disengage said key holes upon upward force being applied by said release cable to said lock lever arm, said lock having a spring located between said lock arm and said leg housing applying force to said lock arm to engage said lock engagement key with a said key hole.

17. The ice chest or cooler of claim 16, wherein said leg housings and said retractable legs are vertically disposed, said release linkage having third and fourth turning blocks respectively spaced outward from corresponding first and second turning blocks relative to said actuator button bracket, said release cable extending over said third turning block between said front leg lock and said first turning block and said cable extending over said fourth turning block between said second turning block and said rear leg lock.

18. The ice chest or cooler of claim 17, wherein said container is square in horizontal cross section.

19. The ice chest or cooler of claim 17, wherein said container is round in cross section and said housing cap is in the shape of an arc conforming with said inner wall.

20. The ice chest or cooler of claim 11, further comprising a housing cap located above each said handle proximate said container lip, and wherein said guides are leg housings having an upper end and a lower end and extend downward from said housing cap and extending downward to points proximate said apertures, said retractable legs being slideably located within said leg housings for extension through said apertures, said front legs and said rear legs extending downward, said outer wall defining a vertical actuator slot therein, said leg release button having mounted for vertical travel within said handle, said leg release button having a bracket extending through said slot, said bracket defining a horizontal actuator bore therethrough, said linkage comprising a release cable having opposed ends and at least first and second turning blocks spaced above and to opposite sides of said release button and bracket, said release cable extending from a front said leg lock, over said first turning block, downward and through said horizontal actuator bore, upward and over said second turning block, and downward to a rear said leg lock, whereby, upon pressing said leg release button downward, said bracket pulls downward on said release cable, thereby pulling said release cable inward over said first and second turning blocks and thereby exerting upward force on said leg locks, releasing said leg locks from said lock receivers.

* * * * *